United States Patent
Genkin et al.

(10) Patent No.: US 6,521,143 B1
(45) Date of Patent: Feb. 18, 2003

(54) CO-PRODUCTION OF CARBON MONOXIDE-RICH SYNGAS WTH HIGH PURITY HYDROGEN

(75) Inventors: Eugene S. Genkin, Emmaus, PA (US); Nitin Madhubhai Patel, Allentown, PA (US); Shoou-I Wang, Allentown, PA (US)

(73) Assignee: Air Products and Chemicals, Inc., Allentown, PA (US)

(*) Notice: Subject to any disclaimer, the term of this patent is extended or adjusted under 35 U.S.C. 154(b) by 0 days.

(21) Appl. No.: 09/549,059

(22) Filed: Apr. 13, 2000

(51) Int. Cl.[7] ............ C07C 1/02; C01B 31/20; C01B 3/18; C01B 3/26
(52) U.S. Cl. ............ 252/373; 423/656; 423/437.2; 423/652
(58) Field of Search ............ 252/372, 373; 423/655, 652, 656, 437.2

(56) References Cited

U.S. PATENT DOCUMENTS

| | | | |
|---|---|---|---|
| 4,476,927 A | * 10/1984 | Riggs | 166/261 |
| 4,733,528 A | * 3/1988 | Pinto | 60/39.12 |
| 4,886,651 A | 12/1989 | Patel | 423/359 |
| 4,888,130 A | 12/1989 | Banquy | 252/373 |
| 5,336,655 A | 8/1994 | Basini et al. | 502/252 |
| 5,496,530 A | 3/1996 | Vannby et al. | 423/418.2 |
| 6,302,943 B1 | * 10/2001 | Johnson et al. | 95/96 |
| 6,328,945 B1 | * 12/2001 | Hufton et al. | 423/418.2 |

FOREIGN PATENT DOCUMENTS

| | | | |
|---|---|---|---|
| EP | 0816290 | 7/1998 | ........ C01B/31/18 |
| GB | 1185450 | 3/1970 | |
| GB | 2123027 | 1/1984 | ........ C01B/3/36 |
| GB | 2168719 | 6/1986 | |
| NL | 1185450 | 7/1968 | |
| WO | 0009441 | 2/2000 | |

OTHER PUBLICATIONS

"Make Low H2/CO Syngas Using . . . ", Dibbern, HC, et al, Hydrocarbon Processing, Jan. 1986.
"Conversion of Natural Gas Into Co-Rich Syngases", Riensche, E., et al, Elsevier Science Pub. 1991.
"Alternative Technologies to Steam–Methane Reforming", Tindall, BM, et al, Hydrocarbon Processing, 1995.

* cited by examiner

*Primary Examiner*—Wayne A. Langel
*Assistant Examiner*—Jonas N. Strickland
(74) *Attorney, Agent, or Firm*—Geoffrey L. Chase

(57) ABSTRACT

A process is provided for simultaneously producing a syngas product having a $H_2/CO$ ratio of less than 2.5 and a hydrogen gas product. The process includes increasing an amount of carbon dioxide being fed to a secondary reformer with carbon dioxide extracted from: (a) an effluent from a primary reformer and (b) an effluent from the secondary reformer. An apparatus for performing the process is also provided.

7 Claims, 4 Drawing Sheets

CO-PRODUCTION OF CARBON MONOXIDE-RICH SYNGAS WITH HIGH PURITY HYDROGEN

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to hydrogen gas production from a gas containing methane, and more particularly to the joint production of hydrogen gas and syngas containing carbon monoxide gas and hydrogen gas.

Currently there are four basic technologies available for producing hydrogen and syngas from natural gas feedstock: (1) steam-methane reforming (SMR); (2) secondary reforming with oxygen (SMR/$O_2$); (3) autothermal reforming (ATR); and thermal partial oxidation ($PO_x$). Each of these four technologies produces syngas with inherently different $H_2$/CO ratios. The range of these ratios can be adjusted by varying the extent to which $CO_2$ is recycled. The ratio is inversely proportional to the percentage of $CO_2$ recycled. That is, the highest $H_2$/CO ratio is obtained when no $CO_2$ is recycled, and the lowest $H_2$/CO ratio is obtained when all $CO_2$ is recycled. Table 1 summarizes $H_2$/CO ratios range for different technologies:

TABLE 1

| Technology | $H_2$/CO Ratio |
|---|---|
| SMR | 3.0–5.0 |
| SMR/$O_2$ | 2.5–4.0 |
| ATR | 1.6–2.7 |
| $PO_x$ | 1.6–1.8 |

Syngas can be obtained at a ratio below the ratios indicated in Table 1 by further processing the reforming effluent in additional gas separation equipment, such as a membrane or PSA apparatus. However, additional gas separation equipment is expensive to purchase and maintain. There have been several attempts made in the past to achieve $H_2$/CO ratios of syngas below those reached at full $CO_2$ recycle (i.e., ratios of 2.5 and lower) directly from the reforming stage without using gas separation equipment.

For example, GB Patent No. 1,185,450 discloses a method wherein additional $CO_2$ is fed to the reformer feed from an outside source to move the following reforming equilibrium:

$$CO+H_2O \leftrightarrows CO_2+H_2 \qquad \text{Equation I}$$

towards more CO production and less $H_2$ production (i.e., towards the left). Although this can be an effective and economical method, it requires a ready source of inexpensive gaseous $CO_2$, which is often not available for CO-rich syngas production. $CO_2$ is generally available from ammonia and conventional hydrogen plants with methanators and $CO_2$ removal systems. However, for currently designed hydrogen plants providing high purity hydrogen supply, there is no $CO_2$ available since they typically use PSA technology and generally eliminate the $CO_2$ removal system and methanator. High purity hydrogen product is the preferred choice of supply in most cases and hydrogen plants designed with PSA are taking more and more market share.

Since there is no $CO_2$ source from those types of plants, the only option to produce CO-rich gas from the reformer effluent side stream is to use costly gas separation equipment. Additionally, extra hydrogen recovered from the side stream to adjust $H_2$/CO ratio in the syngas is often used only as a fuel.

Several patents propose to shift the reforming equilibrium towards CO (i.e., shift Equation I, above, to the left) by making changes to the catalyst system in order to achieve low $H_2$/CO ratios in the syngas. For example, U.S. Pat. No. 5,336,655 discloses a precious metal-based catalyst system said to be capable of achieving a $H_2$/CO ratio as low as 0.85. Data presented in the patent are based on laboratory data at 100 hours of operation. There is no information about operating characteristics of the disclosed catalyst system in an industrial unit, such as the expected life, resistance to poisons, requirements to S/C ratio, etc. Also, carbon formation of about 0.5 mg/g catalyst reported after 100 hours of operation seems to be excessive.

Dibbern et al., "Make low $H_2$/CO syngas using sulfur passivated reforming," Hydrocarbon Processing 71–74 (January 1986), discloses a process of producing low $H_2$/CO syngas product using both imported $CO_2$ and partially poisoned reforming catalyst. The article discloses carbon-free operation of the reformer at significantly reduced steam/carbon ratios down to 0.9. Although the economics of this process demonstrated for the monotube pilot plant unit look attractive, sustained operation of a unit employing the disclosed technology strongly depends on controlled sulfur passivation of the catalyst. The extent of partial catalyst passivation performed by carefully controlled sulfur injection in the reformer feed is a complex variable which is difficult to maintain for a multi-tube reformer without a complicated real-time on-line catalyst evaluation system.

U.S. Pat. No. 5,496,530 discloses another process for preparing CO-rich syngas from a gas mixture of $H_2$ and $CO_2$ over a conversion catalyst. The process occurs adiabatically so that the following exothermic methane-producing (methanation) reaction:

$$CO_2+4H_2 \leftrightarrows CH_4+2H_2O \qquad \text{Equation II}$$

provides necessary heat for the following endothermic CO producing reaction:

$$CO_2+H_2 \leftrightarrows CO+H_2O \qquad \text{Equation III}$$

The process is characterized by very low capital costs, but requires both $H_2$ and $CO_2$ sources to be available. The lowest $H_2$/CO ratio disclosed is 1.5. Significant fractions of methane and $CO_2$ are present in the final syngas product.

EP 0816290 discloses a process of simultaneous production of pure CO and hydrogen or ammonia, wherein a side stream is removed from a secondary reformer effluent of a conventional steam-methane reforming plant, the side stream is cooled to condense out water vapor, and the gas components of the side stream are separated from CO in a gas separation train ($CO_2$ removal, PSA, TSA, cold box), compressed, preheated and recombined into CO-lean syngas stream feeding the CO shift. The conventional plant includes primary and secondary reforming, CO shift, $CO_2$ removal system and methanator used to produce hydrogen or ammonia syngas. The process enjoys cost benefits of integrating co-production of CO with main $H_2$ or $NH_3$ production, but cannot be cost effectively used for the co-production of CO-lean synthesis gas, since that requires mixing of pure CO with CO-rich syngas.

All references cited herein are incorporated herein by reference in their entireties.

BRIEF SUMMARY OF THE INVENTION

The invention provides a process and an apparatus for simultaneously producing a syngas product having a $H_2/CO$ ratio of less than 2.5 and a hydrogen gas product, wherein the process comprises increasing the amount of carbon dioxide being fed to a secondary reformer with carbon dioxide extracted from: (a) an effluent from a primary reformer and (b) an effluent from the secondary reformer.

A preferred process of the invention comprises: (a) diverting a portion of an effluent from a primary reformer to provide a side stream separate from a primary stream of the effluent; (b) reacting water and carbon monoxide in the primary stream to provide an enriched primary stream having increased amounts of carbon dioxide and hydrogen therein; (c) extracting carbon dioxide from the enriched primary stream to provide a hydrogen enriched primary stream and primary extracted carbon dioxide; (d) processing the hydrogen enriched primary stream to provide the hydrogen gas product; (e) feeding the side stream to a secondary reformer; (f) cooling a secondary reformer effluent to provide a cooled side stream; (g) extracting carbon dioxide from the cooled side stream to provide the syngas product and secondary extracted carbon dioxide; and (h) combining the primary and secondary extracted carbon dioxide with the side stream upstream of the secondary reformer.

The apparatus of the invention preferably comprises: (a) a primary reform; (b) a pressure swing adsorption vessel in fluid communication with said primary reformer and adapted to receive a primary stream of said effluent from said primary reformer; (c) a secondary reformer in fluid communication with said primary reformer and adapted to receive a secondary stream of said effluent from said primary reformer; (d) a primary carbon dioxide absorber in fluid communication with said primary reformer and adapted to absorb gaseous carbon dioxide from said primary stream; (e) a secondary carbon dioxide absorber in fluid communication with said secondary reformer and adapted to absorb gaseous carbon dioxide from said side stream; and (f) a carbon dioxide stripper in fluid communication with said primary carbon dioxide absorber, said secondary carbon dioxide absorber and said secondary reformer, wherein said carbon dioxide stripper is adapted to extract carbon dioxide from said primary carbon dioxide absorber and from said secondary carbon dioxide absorber, so as to recycle carbon dioxide to said secondary reformer.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

Figure 1A:
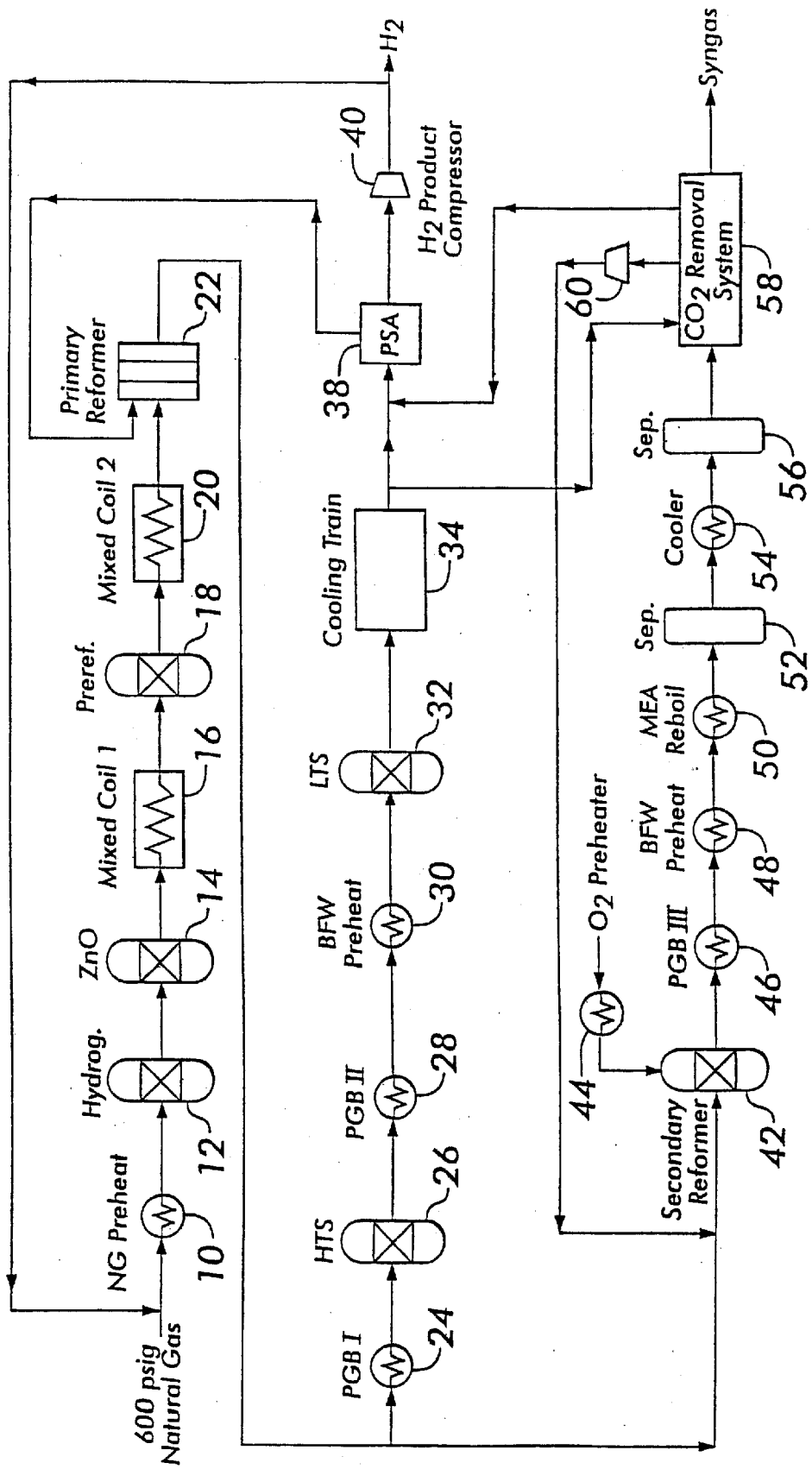
FIG. 1A is a schematic flow chart showing an embodiment of a system of the invention.

The invention provides an integrated process for the simultaneous production of CO-rich syngas and pure hydrogen by processing the partial (i.e., side) stream from the primary reformer effluent.

Referring to the figures, a methane-containing gas, such as natural gas at elevated pressure (e.g., 600 psig), is fed to primary natural gas preheater 10 and heated to a temperature of about 250 to about 380° C. The preheated natural gas is then fed through hydrogenator 12 where the organic sulfur compounds are hydrogenated to hydrogen sulfide over the hydrotreating catalyst and then retained by ZnO. The gas is then fed through ZnO vessel 14 containing a bed of ZnO. Steam is added to the gas after it exits ZnO vessel 14 and prior to entering primary mixed coil 16. The gas then passes from mixed coil 16 through prereformer 18 (primary mixed coil 16 and prereformer 18 being preferred, but optional) and secondary mixed coil 20 before entering primary reformer 22. It is at this stage that the process of the invention begins to deviate from conventional SMR processes. The effluent from primary reformer 22 is split into two portions (or trains). In the embodiment depicted in FIG. 1A, the two portions are the hydrogen gas train and the syngas train. In the embodiment depicted in FIG. 2, the product of the primary train is hydrogen gas and the product of the secondary train is carbon monoxide and syngas. In the embodiment depicted in FIG. 3, the product of the primary train is hydrogen gas and the product of the secondary train is hydrogen gas, carbon monoxide and syngas.

The hydrogen gas train exits primary reformer 22 and passes through process gas boiler I (PGB I) 24, high temperature shift vessel 26, PGB II 28, boiler feed water preheater 30, low temperature shift vessel 32, cooling train 34 and, in part, parallel carbon dioxide removal system 58, before entering pressure swing adsorption (PSA) apparatus 38. The by-pass through the carbon dioxide removal system 58 is provided to recover $CO_2$ to adjust $H_2/CO$ ratio of the syngas. PSA apparatus 38 provides highly purified hydrogen gas and fuel for primary reformer 22. Hydrogen product compressor 40 compresses the hydrogen product for subsequent use. The hydrogen product is preferably at least 99.99% hydrogen, more preferably at least 99.999% hydrogen. Some of the hydrogen can be recycled into the process by addition to the feed gas.

Although it is preferred to provide PGB II 28, boiler feed water preheater 30 and low temperature shift vessel 32 in the hydrogen train as shown in the figures, other configurations that maximize hydrogen recovery are also possible.

The syngas train of FIG. 1A exits primary reformer 22 and is fed through secondary reformer 42, along with preheated oxygen from oxygen preheater 44 and recycled carbon dioxide. The reformed gas from secondary reformer 42 is cooled in a cooling train (e.g., by being fed through PGB III 46, secondary boiler feed water preheater 48, reboiler 50, primary separator 52, cooler 54 and secondary separator 56), and then fed through carbon dioxide removal system 58.

Carbon dioxide removal system 58 can employ physical or chemical sorption or a combination of both. Removed carbon dioxide is recycled back to mix with the partial stream from primary reformer 22 and fed to secondary reformer 42.

Figure 1B:
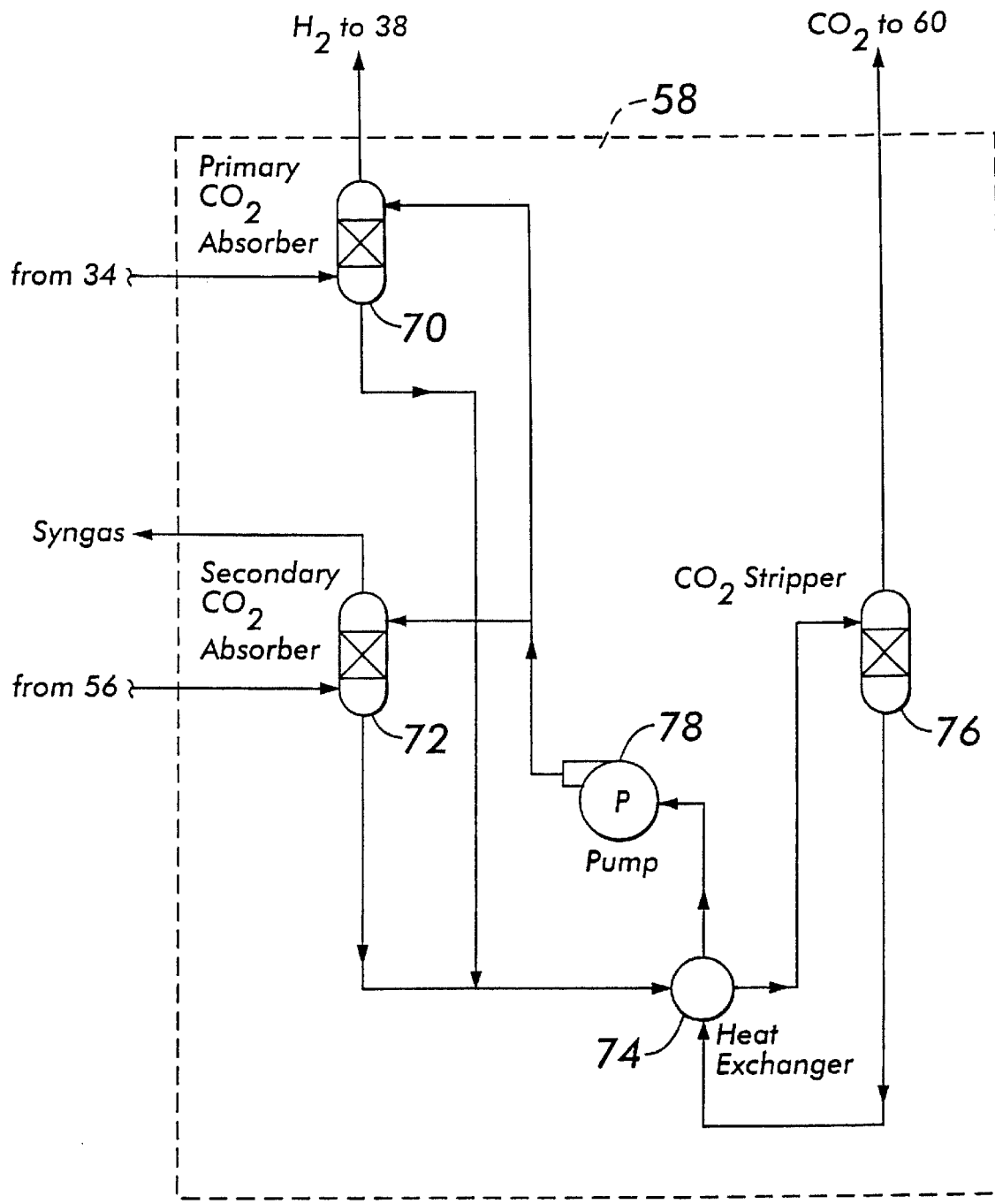
FIG. 1B is an enlarged view of a carbon dioxide removal system shown in the other figures.

As shown in FIG. 1B, carbon dioxide removal system 58 is integrated across both the hydrogen and syngas production lines by having two carbon dioxide absorbing sorbents: one on the primary or hydrogen train (i.e., primary carbon dioxide sorber 70) and another on the secondary or syngas train (i.e., secondary carbon dioxide sorber 72). Portions of the carbon dioxide-rich liquid effluents from the primary and secondary carbon dioxide sorbers are combined, passed through heat exchanger 74 and fed into carbon dioxide stripper 76. Carbon dioxide is then stripped from the combined effluent, thus providing carbon dioxide to recycle compressor 60. The stripped solution exits carbon dioxide stripper 76 as a carbon dioxide-lean liquid, passes through heat exchanger 74 and sent to primary $CO_2$ adsorber and secondary $CO_2$ sorber by pump 78. A portion of the stripped and heat-exchanged effluent is returned to primary carbon dioxide absorber 70 and the balance of the stripped and heat-exchanged effluent is returned to secondary carbon dioxide absorber 72. Hydrogen gas from primary carbon dioxide absorber 70 combined with a by-passed portion of the stream from the cooling train 34 are fed to PSA 38, while the secondary carbon dioxide absorber 72 provides CO-rich syngas product. A typical sorbents are methylethanolamine and methyldiethanolamine which absorb $CO_2$ reversibly by swings in temperature, pressure or both.

Thus, the common carbon dioxide removal system shared by both product lines provides an additional amount of carbon dioxide from the hydrogen train required to shift the equilibrium within the secondary reformer towards more carbon monoxide production and less hydrogen production. The $H_2/CO$ ratio of the syngas product is controlled in the range of 0.5 to 2.5 (preferably 0.5 to 2.0 and in other embodiments less than 2.0) by the bypass around carbon dioxide removal system 58 (i.e., from cooling train 34 to PSA 38) on the hydrogen production line. The methane content in the syngas can be controlled by adjusting the secondary reformer outlet temperature to meet the product specification or to satisfy downstream process requirements (in case of using carbon monoxide-rich gas for carbon monoxide production).

The carbon dioxide removal process integrated between two product lines also benefits the hydrogen production line. Partial removal of carbon dioxide reduces feed to the PSA and increases the hydrogen fraction in the PSA feed. Consequently, the volume of the PSA vessel can be reduced by reducing the carbon portion of the bed. In addition, overall hydrogen recovery from the PSA is improved. Higher PSA recovery results in a higher hydrogen production for a given reformer rate, reduced process equipment sizes and improved plant efficiency.

Figure 2:
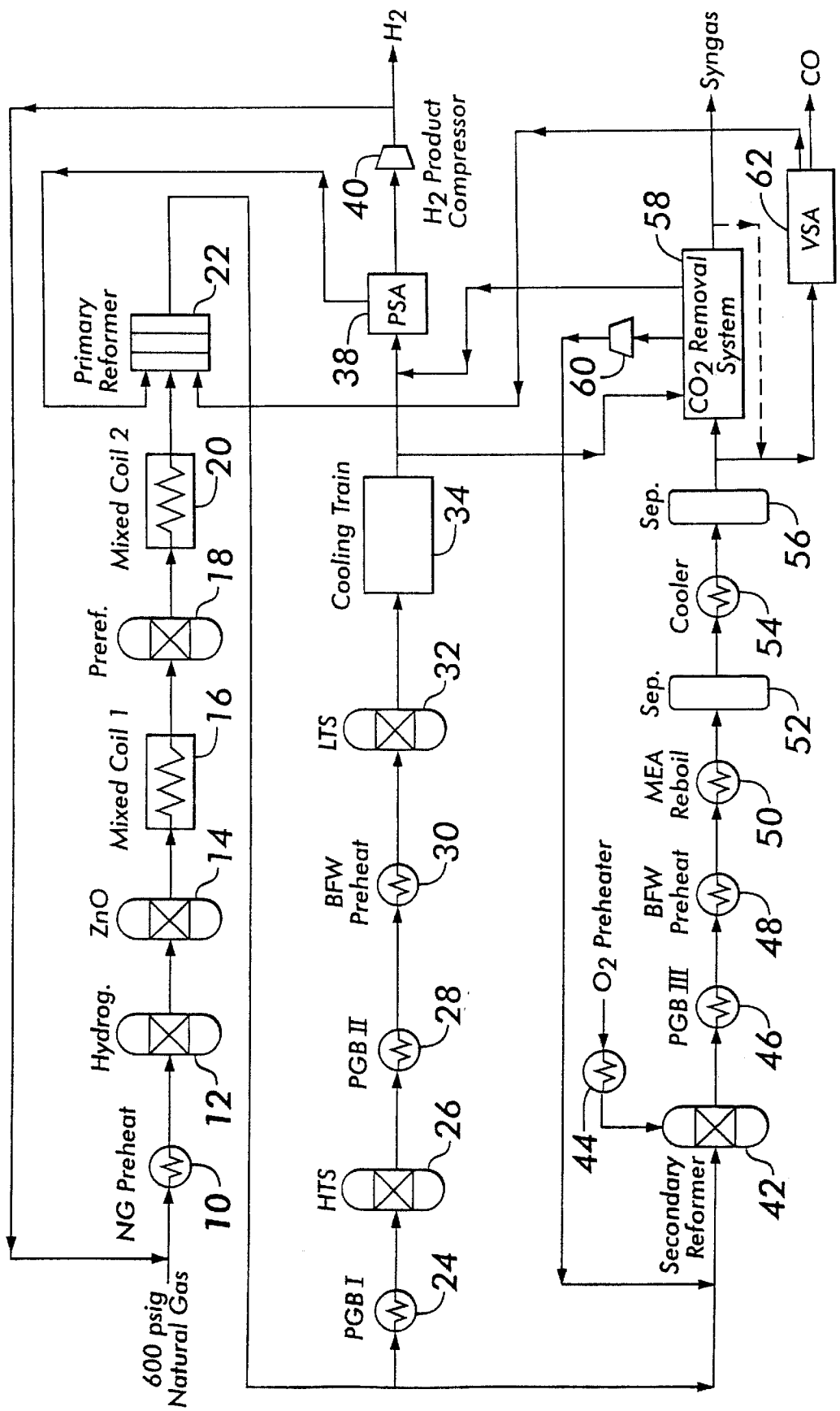
FIGS. 2 and 3 are schematic flow charts showing several different embodiments of a system of the invention.
Figure 3:
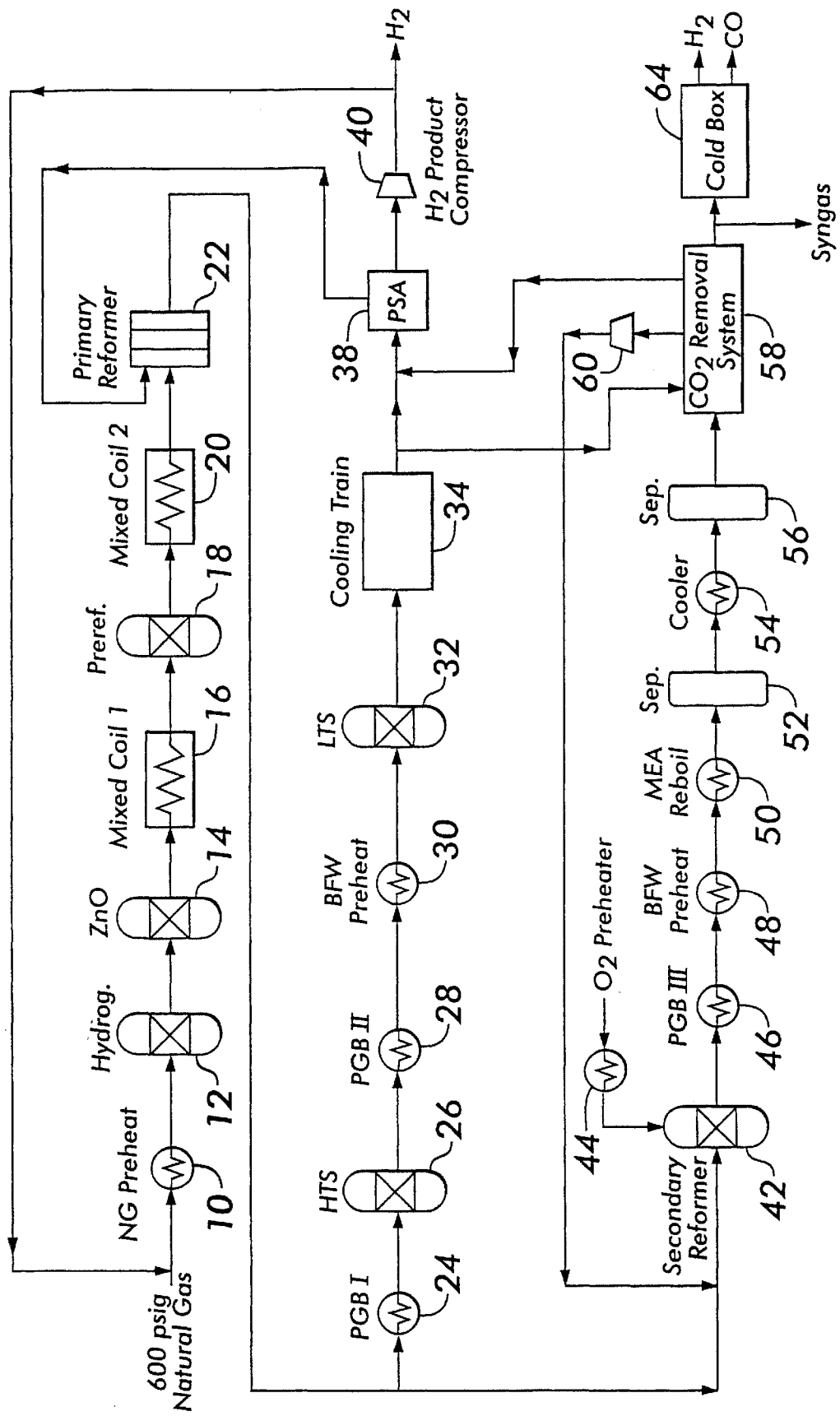

FIGS. 2 and 3 depict embodiments of the invention, wherein hydrogen, syngas and carbon monoxide are final products. The process of FIG. 2 differs from that of FIG. 1A in that a side stream from secondary separator 56, and/or syngas exiting carbon dioxide removal system 58 (this optional pathway indicated by a dashed line), is fed through vacuum swing absorption apparatus 62 to isolate carbon monoxide from the side stream before sending a portion of it to primary reformer 22 as fuel. The process of FIG. 3 differs from that of FIG. 1A in that a portion of the effluent from carbon dioxide removal system 58 is used as syngas and the balance of the effluent is fed through cold box 64 to produce hydrogen product and carbon monoxide product.

In embodiments of the process of the invention, a steam-methane reforming (SMR) hydrogen plant designed without a carbon dioxide removal system mainly intended to use for the production of high purity hydrogen is simultaneously used for the production of carbon monoxide-rich syngas so that when the SMR plant runs a simultaneous production of high purity hydrogen and carbon monoxide-rich syngas it can be achieved without a negative effect on the process of hydrogen production and there is no need to build a separate reformer for carbon monoxide-rich syngas production.

The expanded use of a primary reformer of a high purity hydrogen plant for carbon monoxide-rich syngas production provides a considerable capital cost savings for syngas and hydrogen production lines. Savings for carbon monoxide-rich syngas production comes from eliminating gas separation equipment (such as a PSA, membrane, etc.) and often downstream compression of syngas product. Savings for hydrogen production comes from better plant efficiency and smaller equipment due to higher PSA recovery.

Syngas product can be produced in a wide range of $H_2/CO$ ratios (0.5–4.0) within the same type of HYCO technology.

There is no excess hydrogen produced in the reformer for production of carbon monoxide-rich gas according to the invention, compared to a conventional stand-alone syngas plant, since the required $H_2/CO$ ratio is obtained directly from the secondary reformer. Therefore, additional capital cost savings arise from employing process equipment of reduced size (secondary reformer, cooling train, absorber, etc.) on the syngas product line.

The production of carbon monoxide-rich syngas according to the invention requires less natural gas consumption per unit of syngas produced compared to stand-alone SMR syngas plants, due to elimination of the generation of excess hydrogen in the reformer by producing syngas with required $H_2/CO$ ratio.

In an alternative embodiments of the invention, instead of using secondary reforming of the side stream from the primary reformer, autothermal reforming with a natural gas feed can be used. Such embodiments can be particularly advantageous at high hydrogen rates when there is no extra capacity in the primary reformer, or for low $H_2/CO$ ratio ranges in the syngas. It is also possible to use the autothermal reforming process with a feed containing a mixture of natural gas and primary reformer effluent.

Unlike certain prior art processes, the inventive process is preferably conducted without importing extraneous carbon dioxide from an external source, and without catalyst passivation (e.g., as taught by Dibbern et al., supra). Moreover, there is no need to use special catalysts (e.g., precious metal catalysts, as suggested by U.S. Pat. No. 5,336,655), which can be much more expensive than conventional catalysts.

An apparatus of the invention preferably comprises: (a) a primary.reformer; (b) a secondary reformer in fluid communication with the primary reformer; (c) a pressure swing adsorption vessel in fluid communication with the primary reformer; (d) a primary sorbent adapted to sorb gaseous carbon dioxide from the hydrogen enriched primary stream; and (e) a secondary sorbent adapted to sorb gaseous carbon dioxide from the cooled side stream, wherein the primary sorbent and the secondary sorbent are in fluid communication with the secondary reformer.

As shown in FIG. 2, certain embodiments of the inventive apparatus further comprise a vacuum swing adsorption vessel in fluid communication with the secondary reformer, wherein the secondary reformer is in parallel communication with the secondary substrate and the vacuum swing adsorption vessel.

As shown in FIG. 3, certain embodiments of the inventive apparatus further comprise a cold box in fluid communication with the secondary reformer, and downstream of the secondary substrate.

While the invention has been described in detail and with reference to specific examples thereof, it will be apparent to one skilled in the art that various changes and modifications can be made therein without departing from the spirit and scope thereof.

What is claimed is:

1. A process for simultaneously producing a syngas product having a $H_2/CO$ ratio of 2.5 or less and a hydrogen gas product, said process comprising the steps of:

passing a feed gas comprising a hydrocarbon through a primary reformer to provide a primary effluent;

diverting a portion of said effluent from said primary reformer to provide a side stream separate from a primary stream of said effluent;

reacting water and carbon monoxide in said primary stream to provide an enriched primary stream having increased amounts of carbon dioxide and hydrogen therein;

extracting carbon dioxide from said enriched primary stream to provide a hydrogen enriched primary stream and primary extracted carbon dioxide;

processing said hydrogen enriched primary stream to provide said hydrogen gas product;

feeding at least a portion of said side stream to said secondary reformer to provide a secondary reformer effluent;

cooling said secondary reformer effluent to provide a cooled side stream;

extracting carbon dioxide from said cooled side stream to provide said syngas product and secondary extracted carbon dioxide; and combining said primary and secondary extracted carbon dioxide with said side stream upstream of said secondary reformer to increase the amount of carbon dioxide being fed to the secondary reformer.

2. The process of claim 1, wherein said primary and secondary extracted carbon dioxide are combined after:

selectively sorbing carbon dioxide from said primary stream to a primary sorbent;

selectively sorbing carbon dioxide from said side stream to a secondary sorbent; and stripping from said primary sorbent and said secondary sorbent carbon dioxide selectively sorbed thereby, to provide stripped carbon dioxide for said combining.

3. The process of claim 1, wherein said processing comprises conducting pressure swing adsorption on said hydrogen enriched primary stream to provide said hydrogen gas product.

4. The process of claim 1, further comprising conducting vacuum swing adsorption on a fraction of said cooled side stream to provide a carbon monoxide enriched product gas, and recycling a balance of said fraction to said primary reformer.

5. The process of claim 4, wherein said fraction of said cooled side stream is subjected to said vacuum swing adsorption instead of or after extracting carbon dioxide therefrom.

6. The process of claim 1, further comprising feeding a fraction of said syngas product to a cold box to provide a carbon monoxide enriched product gas and additional hydrogen product gas.

7. The process of claim 8 wherein the syngas has a $H_2/CO$ ratio ranging from 0.5 to 2.0.

* * * * *

UNITED STATES PATENT AND TRADEMARK OFFICE
CERTIFICATE OF CORRECTION

PATENT NO. : 6,521,143 B1
DATED : February 18, 2003
INVENTOR(S) : Eugene S. Genkin et al.

It is certified that error appears in the above-identified patent and that said Letters Patent is hereby corrected as shown below:

Column 8,
Line 25, delete "8" and substitute therefore -- 1 --

Signed and Sealed this

Tenth Day of June, 2003

JAMES E. ROGAN
*Director of the United States Patent and Trademark Office*